Patented Sept. 14, 1926.

1,599,809

UNITED STATES PATENT OFFICE.

JULIAN S. COHEN AND ALLAN B. LEERBURGER, OF NEW YORK, N. Y., ASSIGNORS TO INTERSTATE CHEMICAL COMPANY, OF JERSEY CITY, NEW JERSEY, A CORPORATION OF NEW JERSEY.

INSECTICIDE.

No Drawing.   Application filed November 15, 1924.   Serial No. 750,160.

Our invention relates to insecticides and refers particularly to contact insecticides.

Insecticides may be divided generally into two classes, those which exert their insecticidal properties by internal activity as by passage through the mouth of the insect and those which exert their insecticidal properties by external contact, the latter being known as "contact insecticides", to which latter class the insecticides of our invention belong.

Contact insecticides are particularly efficient in the destruction of sap sucking insects and scale insects.

As the effective results incident to the use of contact insecticides is dependent upon actual contact between the insecticide and the insect, it is essential that they be in such particular form of fume, liquid, or powder, as to allow of efficient dissemination between and upon the foliage with a comparatively complete covering of the same, in order to insure a high degree of actual insect contact.

It is further evident that insecticides of this character be of such composition as not to affect, or injure, the foliage when used in sufficient quantities and strength to have the desired toxic effect upon the insects.

Another desirable feature of an insecticide is that it should be capable of economic production and unaffected in cost on increased demand.

All of the above, and other, desirable and valuable properties are possessed by the insecticides of our invention.

We have found that esters producible from an interaction between alcoholic and carbonic acid have toxic properties of the greatest value in insecticides and that under proper control of strength and application do not injuriously affect foliage.

We have further found that the toxic strength of these compounds is so great that they can be satisfactorily employed in mixtures of considerable dilution, thus allowing of their employment in mixtures containing a great proportion of inert substances, thus materially reducing the cost, while having increased ease of application accompanied by a maximum of insecticide activity.

Another great advantage possessed by the insecticides of our invention is their capability of synthetic production. Contact insecticides are generally of natural formation, an increase of demand naturally resulting in increased selling price. In synthetically produced compounds, such as our insecticides, an increased demand naturally results in decreased cost and selling price, and this fact is of the greatest economic importance.

While we have found that compounds of the series of the toxic esters can be used successfully in the form of their fumes for insecticidal purposes we prefer to use it in powder form, or liquid form, properly diluted, by dusting, or spraying, the foliage of an insect-infected plant.

Among the esters suitable for our invention are di-methyl carbonate, di-ethyl carbonate and their homologues and ester isomers such as isopropyl methyl carbonate and isopropyl ethyl carbonate. By esters, we mean those esters producible from an interaction between aliphatic alcohols and carbonic acid.

The insecticidal efficiency of a mixture naturally depends upon the proportions of the toxic esters and the dilutent and the physical character and chemical properties of the latter.

We give the following as an example of a solid, or dusing, insecticide:—

98 parts of very finely powdered lime are thoroughly mixed with 2 parts di-ethyl carbonate. The resulting mixture can be applied to the plant by dusting it upon the foliage thereof.

The following is an example for the production of a liquid insecticide of our invention:—

97 parts of a neutral soap solution, 15 per cent, is thoroughly mixed with 3 parts diethyl carbonate and agitated, or mixed, until an emulsion is formed. For purposes of spraying, 1 part of the above-described stock emulsion is thoroughly mixed with 30 to 50 parts water.

Insecticides made as above can be applied to plants with great insecticidal effect without injuriously affecting the foliage.

As an example of a method whereby the toxic esters may be employed as a fumigant, we give the following:—

A sufficient quantity of di-ethyl carbonate is incorporated with a soap, wax, or other suitable material to form a homogeneous solid, or semi-solid, mass, which, upon exposure to the air with, or without, artificial heat will allow of the evolution of the toxic fumes.

It is evident that other suitable dilutents may be employed and that members of the toxic esters other than di-ethyl carbonate may be used.

By "inert dilutent" we mean a substance or substances, either gaseous liquid, or solid, which, when used in combination with the toxic esters, will not injuriously affect either the esters with which it is combined in mixture or the foliage to which the mixture is applied, but it can be of known insecticidal value.

It is evident that a plurality of toxic esters can be used in one mixture, and hence, the term "toxic esters" used by us in our claims and elsewhere is intended to include both a single member, or a plurality of members of that series of chemical compounds.

We do not limit ourselves to the particular chemicals, quantities, or steps of production, mentioned herein, as these are given simply as a means for clearly describing our invention.

What we claim is:—

1. An insecticide containing a stable insecticidal ester producible from an interaction between aliphatic alcohols and carbonic acid.

2. An insecticide containing di-ethyl carbonate.

3. In an insecticide in combination, a stable insecticidal ester producible from an interaction between aliphatic alcohols and carbonic acid and an inert dilutent.

4. In an insecticide, in combination, di-ethyl carbonate and an inert dilutent.

5. In an insecticide in combination, a stable insecticidal toxic ester producible from an interaction between aliphatic alcohols and carbonic acid and a soap solution.

6. In an insecticide, in combination, di-ethyl carbonate and a soap solution.

Signed at New York city in the county of New York and State of New York this 11th day of November, 1924.

JULIAN S. COHEN.
ALLAN B. LEERBURGER.